(12) United States Patent  
Roo (10) Patent No.: US 7,761,076 B1  
(45) Date of Patent: *Jul. 20, 2010

(54) APPARATUS AND METHOD FOR CONVERTING SINGLE-ENDED SIGNALS TO A DIFFERENTIAL SIGNAL, AND TRANSCEIVER EMPLOYING SAME

(75) Inventor: Pierte Roo, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 211 days.

This patent is subject to a terminal disclaimer.

(21) Appl. No.: 12/075,231

(22) Filed: Mar. 10, 2008

Related U.S. Application Data (63) Continuation of application No. 09/920,241, filed on Aug. 1, 2001, now Pat. No. 7,433,665, which is a continuation-in-part of application No. 09/629,092, filed on Jul. 31, 2000, now Pat. No. 6,775,529.

(51) Int. Cl.  
*H04B 1/10* (2006.01)  
*H04B 3/20* (2006.01)  
*H04B 1/38* (2006.01)

(52) U.S. Cl. .......... 455/296; 455/295; 455/278.1; 455/63.1; 455/67.13; 455/570; 370/286; 370/289

(58) Field of Classification Search .......... 455/296, 455/295, 278.1, 63.1, 67.13, 570, 78, 326; 370/286, 289

See application file for complete search history.

(56) References Cited

U.S. PATENT DOCUMENTS

| | | | |
|---|---|---|---|
| 3,297,951 A | 1/1967 | Blasbalg | |
| 3,500,215 A | 3/1970 | Leuthold et al. | |
| 3,521,170 A | 7/1970 | Leuthold et al. | |
| 3,543,009 A | 11/1970 | Voelcher, Jr. | |
| 3,793,588 A | 2/1974 | Gerwen et al. | 375/296 |
| 3,793,589 A | 2/1974 | Puckette | |
| 3,973,089 A | 8/1976 | Puckette | |
| 4,071,842 A | 1/1978 | Tewksbury | |
| 4,112,253 A | 9/1978 | Wilhelm | |
| 4,131,767 A | 12/1978 | Weinstein | |
| 4,152,541 A | 5/1979 | Yuen | |
| RE30,111 E | 10/1979 | Blood, Jr. | |
| 4,309,673 A | 1/1982 | Norberg et al. | |
| 4,321,753 A | 3/1982 | Fusari | |

(Continued)

FOREIGN PATENT DOCUMENTS

DE   10 2004 017 497   11/2004

(Continued)

OTHER PUBLICATIONS

U.S. Appl. No. 09/737,743 filed Dec. 2000, Sutardja.

(Continued)

*Primary Examiner*—Eugene Yun (57) ABSTRACT

A communication circuit includes a replica circuit that generates first and second single-ended replica transmit signals. When one of the first and second single-ended replica transmit signals is asserted, the other of the first and second single-ended replica transmit signals is not asserted. A converter circuit includes a differential amplifier including first and second inputs that receive the first and second single-ended replica transmit signals, respectively. The converter circuit converts the first and second single-ended replica transmit signals to a differential replica transmit signal. A receive circuit generates a differential receive signal based on a differential composite signal and the differential replica transmit signal.

25 Claims, 2 Drawing Sheets

U.S. PATENT DOCUMENTS

| | | | |
|---|---|---|---|
| 4,362,909 A | 12/1982 | Snijders et al. |
| 4,393,370 A | 7/1983 | Hareyama |
| 4,393,494 A | 7/1983 | Belforte et al. |
| 4,408,190 A | 10/1983 | Nagano |
| 4,464,545 A | 8/1984 | Werner |
| 4,503,421 A | 3/1985 | Hareyama et al. |
| 4,527,126 A | 7/1985 | Petrich et al. |
| 4,535,206 A | 8/1985 | Falconer |
| 4,591,832 A | 5/1986 | Fling et al. |
| 4,605,826 A | 8/1986 | Kanemasa |
| 4,621,172 A | 11/1986 | Kanemasa et al. |
| 4,621,356 A | 11/1986 | Scipione |
| 4,626,803 A | 12/1986 | Holm |
| 4,715,064 A | 12/1987 | Claessen |
| 4,727,566 A | 2/1988 | Dahlqvist |
| 4,746,903 A | 5/1988 | Czarniak et al. |
| 4,816,830 A | 3/1989 | Cooper |
| 4,817,081 A | 3/1989 | Wouda et al. |
| 4,868,571 A | 9/1989 | Inamasu |
| 4,878,244 A | 10/1989 | Gawargy |
| 4,888,762 A | 12/1989 | Arai |
| 4,894,820 A | 1/1990 | Miyamoto |
| 4,935,919 A | 6/1990 | Hiraguchi |
| 4,947,171 A | 8/1990 | Pfeifer et al. |
| 4,970,715 A | 11/1990 | McMahan |
| 4,972,360 A | 11/1990 | Cukier et al. |
| 4,988,960 A | 1/1991 | Tomisawa |
| 4,993,045 A | 2/1991 | Alfonso |
| 4,999,830 A | 3/1991 | Agazzi |
| 5,018,134 A | 5/1991 | Kokubo et al. |
| 5,043,730 A | 8/1991 | Obinnata |
| 5,084,865 A | 1/1992 | Koike |
| 5,119,365 A | 6/1992 | Warner et al. |
| 5,136,260 A | 8/1992 | Yousefi-Elezei |
| 5,148,427 A | 9/1992 | Buttle et al. |
| 5,153,450 A | 10/1992 | Ruetz |
| 5,164,725 A | 11/1992 | Long |
| 5,175,764 A | 12/1992 | Patel et al. |
| 5,185,538 A | 2/1993 | Kondoh et al. |
| 5,202,528 A | 4/1993 | Iwaooji |
| 5,204,880 A | 4/1993 | Wurster et al. |
| 5,212,659 A | 5/1993 | Scott et al. |
| 5,222,084 A | 6/1993 | Takahashi |
| 5,243,346 A | 9/1993 | Inami |
| 5,243,347 A | 9/1993 | Jackson et al. |
| 5,245,231 A | 9/1993 | Kocis et al. |
| 5,245,654 A | 9/1993 | Wilkison et al. |
| 5,248,956 A | 9/1993 | Himes |
| 5,253,249 A | 10/1993 | Fitzgerald et al. |
| 5,253,272 A | 10/1993 | Jaeger et al. |
| 5,254,994 A | 10/1993 | Takakura et al. |
| 5,267,269 A | 11/1993 | Shih et al. |
| 5,269,313 A | 12/1993 | DePinto |
| 5,272,453 A | 12/1993 | Traynor et al. |
| 5,280,526 A | 1/1994 | Latureli |
| 5,282,157 A | 1/1994 | Murphy et al. |
| 5,283,582 A | 2/1994 | Krenik |
| 5,305,379 A | 4/1994 | Takeuchi |
| 5,307,064 A | 4/1994 | Kudoh |
| 5,307,405 A | 4/1994 | Sih |
| 5,323,157 A | 6/1994 | Ledzius et al. |
| 5,325,400 A | 6/1994 | Co et al. |
| 5,357,145 A | 10/1994 | Segaram |
| 5,365,935 A | 11/1994 | Righter et al. |
| 5,367,540 A | 11/1994 | Kakushi et al. |
| 5,375,147 A | 12/1994 | Awata et al. |
| 5,388,092 A | 2/1995 | Koyama et al. |
| 5,388,123 A | 2/1995 | Uesugi et al. |
| 5,392,042 A | 2/1995 | Pelton |
| 5,399,996 A | 3/1995 | Yates et al. |
| 5,418,478 A | 5/1995 | Van Brunt et al. |
| 5,440,514 A | 8/1995 | Flannagan et al. |
| 5,440,515 A | 8/1995 | Chang et al. |
| 5,444,739 A | 8/1995 | Uesegi et al. |
| 5,465,272 A | 11/1995 | Smith |
| 5,471,665 A | 11/1995 | Pace et al. |
| 5,479,124 A | 12/1995 | Pun et al. |
| 5,489,873 A | 2/1996 | Kamata et al. |
| 5,507,036 A | 4/1996 | Vagher |
| 5,508,656 A | 4/1996 | Jaffard et al. |
| 5,517,141 A | 5/1996 | Abdi et al. |
| 5,517,435 A | 5/1996 | Sugiyama |
| 5,521,540 A | 5/1996 | Marbot |
| 5,537,113 A | 7/1996 | Kawabata |
| 5,539,403 A | 7/1996 | Tani et al. |
| 5,539,405 A | 7/1996 | Norsworthy |
| 5,539,773 A | 7/1996 | Knee et al. |
| 5,559,476 A | 9/1996 | Zhang et al. |
| 5,568,064 A | 10/1996 | Beers et al. |
| 5,568,142 A | 10/1996 | Velazquez et al. |
| 5,572,158 A | 11/1996 | Lee et al. |
| 5,572,159 A | 11/1996 | McFarland |
| 5,577,027 A | 11/1996 | Cheng |
| 5,579,004 A | 11/1996 | Linz |
| 5,585,795 A | 12/1996 | Yuasa et al. |
| 5,585,802 A | 12/1996 | Cabler et al. |
| 5,587,681 A | 12/1996 | Fobbester |
| 5,589,788 A | 12/1996 | Goto |
| 5,596,439 A * | 1/1997 | Dankberg et al. ............ 398/35 |
| 5,600,321 A | 2/1997 | Winen |
| 5,613,233 A | 3/1997 | Vagher |
| 5,625,357 A | 4/1997 | Cabler |
| 5,629,652 A | 5/1997 | Weiss |
| 5,648,738 A | 7/1997 | Welland et al. |
| 5,651,029 A | 7/1997 | Yang |
| 5,659,609 A | 8/1997 | Koizumi et al. |
| 5,663,728 A | 9/1997 | Essenwanger |
| 5,666,354 A | 9/1997 | Cecchi et al. |
| 5,684,482 A | 11/1997 | Galton |
| 5,687,330 A | 11/1997 | Gist et al. |
| 5,696,796 A | 12/1997 | Poklemba |
| 5,703,541 A | 12/1997 | Nakashima |
| 5,719,515 A | 2/1998 | Danger |
| 5,726,583 A | 3/1998 | Kaplinsky |
| 5,745,564 A | 4/1998 | Meek |
| 5,757,219 A | 5/1998 | Weedon et al. |
| 5,757,298 A | 5/1998 | Manley et al. |
| 5,760,726 A | 6/1998 | Koifman et al. |
| 5,790,060 A | 8/1998 | Tesche |
| 5,790,658 A | 8/1998 | Yip et al. |
| 5,796,725 A | 8/1998 | Muraoka |
| 5,798,661 A | 8/1998 | Runaldue et al. |
| 5,798,664 A | 8/1998 | Nagahori et al. |
| 5,812,597 A | 9/1998 | Graham et al. |
| 5,821,892 A | 10/1998 | Smith |
| 5,822,426 A | 10/1998 | Rasmus et al. |
| 5,825,819 A | 10/1998 | Cogburn |
| 5,834,860 A | 11/1998 | Parsons et al. |
| 5,838,177 A | 11/1998 | Keeth |
| 5,838,186 A | 11/1998 | Inoue et al. |
| 5,841,386 A | 11/1998 | Leduc |
| 5,841,809 A | 11/1998 | Koizumi et al. |
| 5,844,439 A | 12/1998 | Zortea |
| 5,859,552 A | 1/1999 | Do et al. |
| 5,864,587 A | 1/1999 | Hunt |
| 5,880,615 A | 3/1999 | Bazes |
| 5,887,059 A | 3/1999 | Xie et al. |
| 5,892,701 A | 4/1999 | Huang et al. ................ 708/819 |
| 5,894,496 A | 4/1999 | Jones |
| 5,898,340 A | 4/1999 | Chatterjee et al. |
| 5,930,686 A | 7/1999 | Devline et al. |
| 5,936,450 A | 8/1999 | Unger |
| 5,940,442 A | 8/1999 | Wong et al. |
| 5,940,498 A | 8/1999 | Bardl |

| | | | |
|---|---|---|---|
| 5,949,362 A | 9/1999 | Tesch et al. | |
| 5,963,069 A | 10/1999 | Jefferson et al. | |
| 5,982,317 A | 11/1999 | Steensgaard-Madison | |
| 5,999,044 A | 12/1999 | Wohlfarth et al. | |
| 6,005,370 A | 12/1999 | Gustavson | |
| 6,014,048 A | 1/2000 | Talaga et al. | |
| 6,037,812 A | 3/2000 | Gaudet | |
| 6,038,266 A | 3/2000 | Lee et al. | |
| 6,043,766 A | 3/2000 | Hee et al. | |
| 6,044,489 A | 3/2000 | Hee et al. | |
| 6,046,607 A | 4/2000 | Kohdaka | |
| 6,047,346 A | 4/2000 | Lau et al. | |
| 6,049,706 A | 4/2000 | Cook et al. | |
| 6,052,076 A | 4/2000 | Patton, III et al. | |
| 6,057,716 A | 5/2000 | Dinteman et al. | |
| 6,067,327 A | 5/2000 | Creigh et al. | |
| 6,087,968 A | 7/2000 | Roza | |
| 6,094,082 A | 7/2000 | Gaudet | |
| 6,100,830 A | 8/2000 | Dedic | |
| 6,121,831 A | 9/2000 | Mack | |
| 6,137,328 A | 10/2000 | Sung | |
| 6,140,857 A | 10/2000 | Bazes | |
| 6,148,025 A | 11/2000 | Shirani et al. | |
| 6,150,856 A | 11/2000 | Morzano | |
| 6,154,784 A | 11/2000 | Liu | |
| 6,163,283 A | 12/2000 | Schofield | |
| 6,163,289 A | 12/2000 | Ginetti | |
| 6,163,579 A | 12/2000 | Harrington et al. | |
| 6,166,572 A | 12/2000 | Yamoaka | |
| 6,172,634 B1 | 1/2001 | Leonowich et al. | |
| 6,173,019 B1 | 1/2001 | Hee et al. | |
| 6,177,896 B1 | 1/2001 | Min | |
| 6,185,263 B1 | 2/2001 | Chan | |
| 6,188,282 B1 | 2/2001 | Montalvo | |
| 6,191,719 B1 | 2/2001 | Bult et al. | |
| 6,192,226 B1 | 2/2001 | Fang | |
| 6,201,490 B1 | 3/2001 | Kawano et al. | |
| 6,201,831 B1 | 3/2001 | Agazzi et al. | |
| 6,201,841 B1 | 3/2001 | Iwamatsu et al. | |
| 6,204,788 B1 | 3/2001 | Tani | |
| 6,211,716 B1 | 4/2001 | Nguyen et al. | |
| 6,215,429 B1 | 4/2001 | Fischer et al. | |
| 6,223,061 B1 | 4/2001 | Dacus et al. | |
| 6,236,345 B1 | 5/2001 | Dagnachew et al. | |
| 6,236,346 B1 | 5/2001 | Schofield | |
| 6,236,645 B1 | 5/2001 | Agazzi | |
| 6,249,164 B1 | 6/2001 | Cranford, Jr. et al. | |
| 6,249,249 B1 | 6/2001 | Obayashi et al. | |
| 6,259,680 B1 | 7/2001 | Blackwell et al. | |
| 6,259,745 B1 | 7/2001 | Chan | |
| 6,259,957 B1 | 7/2001 | Alexander et al. | |
| 6,266,367 B1 | 7/2001 | Strait | |
| 6,271,782 B1 | 8/2001 | Steensgaard-Madsen | |
| 6,275,098 B1 | 8/2001 | Uehara et al. | |
| 6,288,592 B1 | 9/2001 | Gupta | 327/392 |
| 6,288,604 B1 | 9/2001 | Shih et al. | |
| 6,289,068 B1 | 9/2001 | Hassoun et al. | |
| 6,295,012 B1 | 9/2001 | Greig | |
| 6,298,046 B1 | 10/2001 | Thiele | |
| 6,307,490 B1 | 10/2001 | Litfin et al. | |
| 6,309,077 B1 | 10/2001 | Saif et al. | |
| 6,313,775 B1 | 11/2001 | Lindfors et al. | |
| 6,332,004 B1 | 12/2001 | Chang | |
| 6,333,959 B1 | 12/2001 | Lai et al. | |
| 6,339,390 B1 | 1/2002 | Velazquez et al. | |
| 6,340,940 B1 | 1/2002 | Melanson | |
| 6,346,899 B1 | 2/2002 | Hadidi | |
| 6,351,229 B1 | 2/2002 | Wang | |
| RE37,619 E | 4/2002 | Mercer et al. | |
| 6,369,734 B2 | 4/2002 | Volk | |
| 6,370,190 B1 | 4/2002 | Young et al. | |
| 6,373,417 B1 | 4/2002 | Melanson | |
| 6,373,908 B2 | 4/2002 | Chan | |
| 6,377,640 B2 | 4/2002 | Trans | |
| 6,377,683 B1 | 4/2002 | Dobson et al. | |
| 6,385,238 B1 | 5/2002 | Nguyen et al. | |
| 6,385,442 B1 | 5/2002 | Vu et al. | |
| 6,389,077 B1 | 5/2002 | Chan | |
| 6,408,032 B1 | 6/2002 | Lye et al. | |
| 6,411,647 B1 | 6/2002 | Chan | |
| 6,415,003 B1 | 7/2002 | Raghaven | |
| 6,421,377 B1 | 7/2002 | Langberg et al. | |
| 6,421,534 B1 | 7/2002 | Cook et al. | |
| 6,433,608 B1 | 8/2002 | Huang | |
| 6,441,761 B1 | 8/2002 | Viswanathan | |
| 6,452,428 B1 | 9/2002 | Mooney et al. | |
| 6,462,688 B1 | 10/2002 | Sutardja | |
| 6,468,032 B2 | 10/2002 | Patel | |
| 6,469,988 B1 | 10/2002 | Yang et al. | 370/289 |
| 6,476,746 B2 | 11/2002 | Viswanathan | |
| 6,476,749 B1 | 11/2002 | Yeap et al. | |
| 6,477,200 B1 | 11/2002 | Agazzi et al. | |
| 6,492,922 B1 | 12/2002 | New | |
| 6,501,402 B2 | 12/2002 | Boxho | |
| 6,509,854 B1 | 1/2003 | Morita et al. | |
| 6,509,857 B1 | 1/2003 | Nakao | |
| 6,531,973 B2 | 3/2003 | Brooks et al. | |
| 6,535,987 B1 | 3/2003 | Ferrant | |
| 6,539,072 B1 | 3/2003 | Donnelly et al. | |
| 6,556,677 B1 * | 4/2003 | Hardy | 379/406.01 |
| 6,563,870 B1 | 5/2003 | Schenk | |
| 6,570,931 B1 | 5/2003 | Song | |
| 6,576,746 B1 | 6/2003 | McBride et al. | |
| 6,577,114 B1 | 6/2003 | Roo | |
| 6,583,742 B1 | 6/2003 | Hossack | |
| 6,594,304 B2 | 7/2003 | Chan | |
| 6,606,489 B2 * | 8/2003 | Razavi et al. | 455/323 |
| 6,608,743 B1 | 8/2003 | Suzuki | |
| 6,633,178 B2 | 10/2003 | Wilcox et al. | |
| 6,687,286 B1 | 2/2004 | Leonowich et al. | |
| 6,690,742 B2 | 2/2004 | Chan | |
| 6,714,825 B1 | 3/2004 | Tanaka | |
| 6,721,379 B1 | 4/2004 | Cranford, Jr. et al. | |
| 6,731,748 B1 | 5/2004 | Edgar, III et al. | |
| 6,744,831 B2 | 6/2004 | Chan | |
| 6,744,931 B2 | 6/2004 | Komiya et al. | |
| 6,751,202 B1 | 6/2004 | Henrie | |
| 6,765,931 B1 | 7/2004 | Rabenko et al. | |
| 6,775,529 B1 | 8/2004 | Roo | |
| 6,816,097 B2 | 11/2004 | Brooks et al. | |
| 6,823,028 B1 | 11/2004 | Phanse | |
| 6,844,837 B1 | 1/2005 | Sutardja | |
| 6,864,726 B2 | 3/2005 | Levin et al. | |
| 6,870,881 B1 | 3/2005 | He | |
| 6,882,216 B2 | 4/2005 | Kang | |
| 6,980,644 B1 | 12/2005 | Sallaway et al. | |
| 7,095,348 B1 | 8/2006 | Sutardja et al. | |
| 7,113,121 B1 | 9/2006 | Sutardja et al. | |
| 7,194,037 B1 | 3/2007 | Sutardja | |
| 7,280,060 B1 | 10/2007 | Sutardja et al. | |
| 7,312,739 B1 | 12/2007 | Sutardja et al. | |
| 2001/0050585 A1 | 12/2001 | Carr | |
| 2002/0009057 A1 | 1/2002 | Blackwell et al. | |
| 2002/0061087 A1 | 5/2002 | Williams | |
| 2002/0084857 A1 | 7/2002 | Kim | |
| 2002/0136321 A1 | 9/2002 | Chan | |
| 2002/0181601 A1 | 12/2002 | Huang et al. | |
| 2003/0002570 A1 | 1/2003 | Chan | |
| 2003/0174660 A1 | 9/2003 | Blon et al. | |
| 2004/0005015 A1 | 1/2004 | Chan | |
| 2004/0090981 A1 | 5/2004 | Lin et al. | |
| 2004/0091071 A1 | 5/2004 | Lin et al. | |
| 2004/0105504 A1 | 6/2004 | Chan | |
| 2004/0141569 A1 | 7/2004 | Agazzi | |
| 2004/0208312 A1 | 10/2004 | Okuda | |

2005/0025266 A1  2/2005  Chan

FOREIGN PATENT DOCUMENTS

| EP | 0800 278 | 8/1997 |
|---|---|---|
| JP | 57-48827 | 3/1982 |
| JP | 58-111415 | 7/1983 |
| JP | 62-159925 | 7/1987 |
| JP | 63-300700 | 7/1988 |
| JP | 204527 | 8/1989 |
| JP | 3-273704 | 12/1991 |
| JP | 4-293306 | 10/1992 |
| JP | 4-351109 | 12/1992 |
| JP | 05-064231 | 3/1993 |
| JP | 06-029853 | 2/1994 |
| JP | 06-98731 | 4/1994 |
| JP | 6-276182 | 9/1994 |
| JP | 7-131260 | 5/1995 |
| JP | 09-55770 | 8/1995 |
| JP | 09-270707 | 3/1996 |
| JP | 10-126183 | 5/1998 |
| JP | 2001-177409 | 12/1999 |
| JP | 06-97831 | 4/2005 |
| JP | 09-270707 | 4/2005 |
| JP | 2001-177409 | 4/2005 |
| TW | 0497334 | 8/2002 |
| TW | 0512608 | 12/2002 |
| TW | 0545016 | 8/2003 |
| WO | WO 99/46867 | 9/1999 |
| WO | WO 00/27079 | 5/2000 |
| WO | WO 00/28663 | 5/2000 |
| WO | WO 00/28663 A2 | 5/2000 |
| WO | WO 00/28663 A3 | 5/2000 |
| WO | WO 00/28668 | 5/2000 |
| WO | WO 00/28691 | 5/2000 |
| WO | WO 00/28691 A2 | 5/2000 |
| WO | WO 00/28691 A3 | 5/2000 |
| WO | WO 00/28712 | 5/2000 |
| WO | WO 00/35094 | 6/2000 |

OTHER PUBLICATIONS

U.S. Appl. No. 09/920,240, filed Aug. 1, 2001, Roo, Pierte.
U.S. Appl. No. 09/920,241, filed Aug. 2001, Roo.
U.S. Appl. No. 60/106,265, Oct. 1998, Chan.
U.S. Appl. No. 60/107,105, Nov. 1998, Chan.
U.S. Appl. No. 60/107,702, Nov. 1998, Chan.
U.S. Appl. No. 60/108,001, Nov. 1998, Chan.
Abidi et al; "FA 7.2: The Future of CMOS Wireless Transceivers"; Feb. 7, 1997, pp. 118-119, 440.
Abidi, "TP 11.1: Direct-Conversion Radio Transceivers for Digital Communications" 1995.
American National Standard, "Fibre Distributed Data interface (FDDI)—Token Ring Twisted Pair Layer Medium Dependent (TP-PMD)", Sep. 25, 1995.
Analysis and Design of Analog Integrated Circuits, Wiley, New York, Fourth Edition; 1977; 7 pages.
Azadet et al; "A Gigabit Transceiver Chip Set for UTP CA-6 Cables in Digital CMOS Technology"; Feb. 2000.
Azadet, Kamran Nicole, Chris; "Low-Power Equalizer Architectures for High-Speed Modems"; Oct. 1998; pp. 118-126.
Baird et al; "A Mixed Sample 120M s PRML Solution for DVD Systems", 1999.
Baker, "An Adaptive Cable Equalizer for Serial Digital Rates to 400Mb/s", 1996.
Banu et al; "A BiCMOS Double-Low-IF Receiver for GSM", 1997, pp. 521-524.
Bertolaccini, Mario et al; "A Precision Baseline Offset and Drift Corrector for Low-Frequency Applications", IEEE Transactions on Instrumentation and Measurement, vol. IM-34, No. 3, Sep. 1985, pp. 405-412.
Chan et al; A 100 Mb/s CMOS 100Base-T4 Fast Ethernet Transceiver for Category 3, 4 and 5 UTP, 1998.

Chang et al; "A CMOS Channel-Select Filter for a Direct-Conversion Wireless Receiver", 1996, pp. 62-63.
Chang et al; Large Suspended Inductors on Silicon and Their Use in a 1-μm CMOS RF Amplifier, May 1993, pp. 246-248.
Chien et al; "TP 12.4: A 900-MHz Local Oscillator using a DLL-based Frequency Multiplier Technique for PCS Applications"; Journal of IEEE Solid State Circuits; Feb. 2000; pp. 202-203 and 458.
Chien, "Delay Based Monolithic CMOS Frequency Synthesizer for Portable Wireless Applications", May 20, 1998.
Chien; "Low-Noise Local Oscillator Design Techniques using DLL-based Frequency Multiplier for Wireless Applications"; Dissertation; Univ. of Calif., Berkley; Spring 2000.
Chien; "Monolithic CMOS Frequency Synthesizer for Cellular Applications"; Solid State Circuits, IEEE Journal of, vol. 35, Issue 12, Dec. 2000.
Chin et al; "A 10-b 125 MHz CMOS digital-to-analog (DAC) with threshold-voltage compensated current sources", Nov. 1994, pp. 1374-1380.
Cho et al; "A Single-Chip CMOS Direct Conversion Transceiver for 900 MHz Spread-Spectrum Digital Cordless Telephones"; 1999, pp. 228-229, 464.
Craninckx et al: "A 1.8-GHz Low-Phase-Noise CMOS VCO Using Optimized Hollow Spiral Inductors"; 1997, pp. 736-744.
Craninckx et al; "A 1.8-GHz Low-Phase-Noise Voltage-Controlled Oscillator with Prescaler"; 1995, pp. 1474-1482.
Daily et al; "Digital Systems Engineering"; Cambridge Univ. Press; Jun. 1998; cover and pp. 390-391.
Daily et al; "High Performance Electrical Signaling"; Jun. 1998.
Dauphinee et al; "SP 23.7: A Balanced 1.5 GHz Voltage Controlled Oscillator with an Integrated LC Resonator", 1997, pp. 390-391, 491.
Davies; "Digital Generation of Low-Frequency Sine Waves", Jun. 1969, pp. 97-105.
Dec et al; "MP 4.8: A 1.9 GHz Micromachine-Based Low-Phase-Noise CMOS VCO"; 1999, pp. 80-81, 449.
Dehng et al; "A Fast-Lock Mixed-Mode DLL Using a 2-b SAR Algorithm"; IEEE Journal of Solid State Circuits, vol. 36, No. 10; Oct. 2001; pp. 1464-1471.
Dehng et al; "Clock-Deskaw Buffer Using a SAR-Controlled Delay-Locked Loop";IEEE Journal of Solid State Circuits; Nov. 2002; vol. 35, No. 8; pp. 1128-1136.
Dolle, "A Dynamic Line-Termiantion Circuit for Multireceiver Nets", Dec. 1993, pp. 1370-1373.
DP83220 CDL "Twisted Pair FDDI Transceiver Device", Oct. 1992.
Dunning, Jim, "An All-Digital Phase-Locked Loop with 50-Cycle Lock Time Suitable for High-Performance Microprocessors", IEEE Journal of Solid-State Circuits, vol. 30, No. 4, Apr. 1995, pp. 412-422.
Efendovich et al; "Multifrequency Zero-Jitter Delay-Locked Loop", Jan. 1994, 67-70.
Eto et al; "A 333 MHz, 20mW, 18ps Resolution Digital DLL using Current-controlled Delay with Parallel Variables Resistor DAC (PVR-DAC)"; Aug. 28-30, 2000, pp. 349-350.
Everitt et al; "A 10/100Mb/s CMOS Ethernet Transceiver for 10BaseT, 10BaseTX and 100BaseFX", 1998.
Everitt, James et al; "A CMOS Transceiver for 10-Mb/s and 100-Mb/s Ethernet", IEEE Journal of Solid-State Circuits, vol. 33, No. 12, Dec. 1998, pp. 2169-2177.
Farjad-rad, et al; "4.5 A 0.2-2GHz 12mW Multiplying DLL for Low-Jitter Clock Synthesis in Highly Integrated Data Communication Chip"; 2002; 8 pgs. IEEE—ISSCC—Jan. 2000.
Fournier et al; "A 130-MHz 8-b CMOS video DAC for HDTV applications"; Jul. 1991, pp. 1073-1077.
Fuad Surial Atiya et al; "An Operational Amplifier Circulator Based on the Weighted Summer", Jun. 1975.
Gabara; "On-Chip Terminating Registers for High Speed ECL-CMOS Interfaces", 1992, pp. 292-295.
Gardner, "Charge-Pump Phase-Lock Loops", Nov. 1980, pp. 1849-1858.
Garlepp et al; "A Portable Digital DLL Architecture for CMOS Interface Circuits", Feb. 1998 Symposium on VLSI Circuits, Digest of Technical Papers, pp. 214-215.
Gharpurey et al; Modeling and Analysis of Substrate Coupling in Integrated Circuits, Mar. 1996, pp. 344-353.

Gigabit Ethernet Alliance; "Gigabit Ethernet 1000Base-T", copyright 1997.
Goldberg, Lee; "Gigabit Ethernet PHY Chip Sets LAN Speed Record for CopperStory"; Tech Insights; Nov. 16, 1998.
Gotoh et al; "All-Digital Multi-Phase Delay Locked Loop for Internal Timing Generation in Embedded and/or High-Speed DRAMS"; IEEE Symposium on VLSI Circuits, Feb. 1997.
Gray et al; "Analysis and Design of Analog Integrated Circuits", Apr. 9, 2001; pp. 217-221.
Gray et al; "Analysis and Design of Analog Integrated Circuits", Apr. 9, 2001; pp. 270 and 274.
Gray et al; "Future Directions in Silicon ICs for RF Personal Communications", 1995, pp. 83-90.
H4000 Digital Ethernet Transceiver Technical Manual, Distributed Systems, Chapter 3, pp. 3-1 to 3-11, copyright 1982 by Digital Equipment Corporation.
Hajimiri et al; "Phase Noise in Multi-Gigahertz CMOS Ring Oscillators", 1998, 49-52.
Hamasaki et al; "A 3-V, 22-mV Multibit Current Mode $\Sigma\Delta$ DAC with 100 dB Dynamic Range"; Dec. 1996, pp. 1888-1894.
Harald et al; "Design of a 10-bit 100 MSamples/s BiCMOS D/A Converter", 1996, pp. 730-733.
He et al; "A DSP Receiver for 1000 Base-T PHY"; IEE Solid State Circuits Conf. 2001, Digest of Tech Papers; IEEE Journal of Solid State Circuits, Feb. 2001.
Heliums et al; "An ADSL Integrated Active Hybrid Circuit"; Aug. 7, 2002.
Hellwarth et al; "Digital-to-analog Converter having Common-mode Isolation and Differential Output"; IBM Journal of Research & Development; Jan. 1973.
Henriques et al; "A CMOS Steering-Current Multiplying Digital-to-Analog Converter"; 1995, pp. 145-155.
Hester et al; "CODEC for Echo-Canceling Full-Rate ADSL Modems"; Dec. 1999.
Horowitz et al; "High-Speed Electrical Signaling: Overview and Limitations", 1998, p. 12-24.
Hu et al; "A Monolithic 480 Mb/s Parallel AGC/Decision/Clock-Recovery Circuit in 1.2-µm CMOS"; Dec. 1993, pp. 1314-1320.
Hung et al; "A 1.24-GHz Monolithic CMOS VCO with Phase Noise of 137 dBc/Hz at a 3-MHz Offset"; 1999, pp. 111-113.
IEEE Standards 802.3: Part 3 Carrier Sense Multiple Access with Collision Detection (CSMA/CD) Access Method and Physical Detection; Mar. 8, 2002, pp. 1-1538.
IEEE Standards 802.3ab-2002, "Part 3: Carrier sense multiple access with collision detection (CSMA/CD) access method and physical layer specifications"; Mar. 8, 2002; pp. 147-249.
Intersil, HC-5509B ITU CO/Loop Carrier SLIC, Aug. 2003.
ISSCC '99 Short Course Information, Fast Area Networks, 3 pages; Feb. 18, 1999.
Ivan Jorgensen et al; "Design of a 10-bit 100 MSamples/s BICMOS D/A Converter", 1996, pp. 730-733.
Jansen et al; SP 23.8: Silicon Bipolar VCO Family for 1.1 to 2.2 GHz with Fully-Integrated Tank and Tuning Circuits, Feb. 8, 1997, 392-393, 492.
Johns et al; "Integrated Circuits for Data Transmission Over Twisted Pair Channels", Mar. 1997, pp. 398-406.
Johnson et al; "THAM 11.2: A Variable Delay Line Phase Locked Loop for CPU-Coprocessor Synchronization"; IEEE Solid State Circuits Conf., Feb. 1988; pp. 142-143; 334-335.
Kelly, N. Patrick et al; "WA 18.5—A Mixed-Signal DFE/FFE Receiver for 100Base-TX Applications", ISSCC 2000/Session 18/Wireline Communications/Paper WA 18.5, 2000 IEEE Int'l. Solid-State Circuits Conf., Feb. 7, 2000; pp. 310-311.
Kim et al; "A 30-MHz Hybrid Analog/Digital Clock Recovery Circuit in 2-um CMOS", 1990, pp. 1385-1394.
Kim et al; "A Low-Power Small-Area 7.28-ps-Jitter 1-GHz DLL-Based Clock Generator"; IEEE Journal of Solid State Circuits; Nov. 2002; vol. 37, No. 11; pp. 1414-1420.
Kim et al; "PLL/DLL System Noise Analysis for Low Jitter Clock Synthesizer Design"; 1994 IEEE Symposium on Circuits and Systems; May 1994; pp. 31-34.
Kinget, FP 14.7: A Fully Integrated 2.7V 0.35µm CMOS VCO for 5 GHz Wireless Applications, Feb. 5, 1998.

Knight, Jr. et al; A Self-Terminating Low-Voltage Swing CMOS Output Driver, 1988, 457-464.
Koullias et al; "TP 9.2: A 900 MHz Transceiver Chip Set for Dual-Mode Cellular Radio Mobile Terminals", 1993, pp. 140-141, 278.
Lam et al; "WP 23.6: A 2.6 GHz/5.2 GHz CMOS Voltage-Controlled Oscillator", 1999, pp. 402-403, 484.
Lee et al; "A 2.5 V CMOS Delay-Locked Loop for an 18 Mbit, 500 Megabytes/s DRAM"; 1994, pp. 1491-1496.
Lee et al; "A 3V 10b 100 MS/s Digital-to-Analog Converter for Cable Modem Applications", Aug. 28-30, 2000; pp. 203-205.
Lee et al; "A CMOS Serial Link for Fully Duplexed Data Communication", Apr. 1995.
Lee et al; "A Fully Integrated Low-Noise 1-GHz Frequency Synthesizer Design for Mobile Communication Application"; May 1997, pp. 760-765.
Leong et al., A 2.7-v 900-MHz/1.9-GHz Dual-Band Transceiver IC for Digital Wireless Communication; Mar. 1999; IEEE Journal of Solid-State Circuits, vol. 34, Issue 3, pp. 286-291.
Letham et al; "A high-performance CMOS 70-Mhzpalette/DAC", Dec. 1987, pp. 1041-1047.
Liberali et al; "Progress in High-Speed and High-Resolution CMOS Data Converters", Sep. 12-14, 1995, pp. 19-28.
Lin et al; "A 10-b, 500-Msample/s CMOS DAC in 0.6mm2"; IEEE; Dec. 1996; 11 pgs.
Lin et al; "A Register-Controller Symmetrical DLL for Double-Data-Rate DRAM"; IEEE Journal Solid State Circuits; Apr. 1999; pp. 565-568.
Lin et al; "TP 12.5: a 1.4 GHz Differential Low-Noise CMOS Frequency Synthesizer using a Wideband PLL Architecture"; Feb. 2000; pp. 204-205 and 458.
Linear Technology, "High Speed Modem Solutions", InfoCard 20, Linear Technology Corporation; www.linear-tech.com; LT/TP 0500 4X; Apr. 1997.
Linear Technology, LT1355/LT1356, Dual and Quad 12MHz, 400V/us Op Amps, Linear Technology Corporation, pp. 1-16; Apr. 1994.
Linear Technology, LT1358/LT1359, Dual and Quad 25MHz, 600V/us Op Amps, Linear Technology Corporation, pp. 1-12; Apr. 1994.
Linear Technology, LT1361/LT1362, Dual and Quad 50MHz, 800V/us Op Amps, Linear Technology Corporation, pp. 1-12; Apr. 1994.
Linear Technology, LT1364/LT1365, Dual and Quad 70MHz, 1000V/us Op Amps, Linear Technology Corporation, pp. 1-12; Apr. 1994.
Linear Technology, LT1813/LT1814, Dual and Quad 3mA, 100MHz, 750V/us Op Amps, Linear Technology Corporation, pp. 1-16; Feb. 2001.
Liu et al; "WP 23.7: A 6.5 GHz Monolithic CMOS Voltage-Controlled Oscillator", 1999, pp. 404-405, 484.
Maneatis, John G.; FA 8.1: Low-Jitter Process-Independent DLL and PLL Based on Self-Biased Techniques; Nov. 1996; pp. 1723-1732.
Mano; "Digital Logic and Computer Design"; Prentice Hall; copyright Jan. 1979; 627 pgs.
Marshall et al; "TA 8.7: A 2.7V GSM Transceiver ICs with On-Chip Filtering", 1995.
Miki et al; "An 80-MHz 8-bit CMOS D/A Converter", Dec. 1986, pp. 983-988.
Millman et al; "Pulse, Digital, and Switching Waveforms"; Jun. 1965; pp. 674-675.
Moon, Yongsam et al; "An All-Analog Multiphase Delay-Locked Loop Using a Replica Delay Line for Wide-Range Operation and Low-Jitter Performance", IEEE Journal of Solid-State Circuits, vol. 35, No. 3, Mar. 2000, pp. 377-384.
Mueller, K.H.; "Combining Echo Cancellation and Decision Feedback Equalization", The Bell System Technical Journal, vol. 58, No. 2, Feb. 1979, pp. 491-500.
Munshi et al; "Adaptive Impedance Matching"; Dec. 1999; pp. 69-72.
Myson Technology; "MTD214—Ethernet Encoder/Decoder and 10BaseT Transceiver with Built-in Waveform Shaper"; 1997, pp. 1-11.
Myson Technology; "MTD972 (Preliminary) 100BaseTX PCS/PMA", 1997, pp. 1-21.
Nack et al; "A Constant Slew Rate Ethernet Line Driver", May 2001.

Nakamura et al; "A 10-b 70-MS/s CMOS D/A converter", Apr. 1991, pp. 637-642.

Narayanan et al; "Doppler Estimation Using a Coherent Ultrawide-Band Random Noise Radar", Jun. 2000.

Nguyen et al; "Si IC-Compatible Inductors and LC Passive Filters", Aug. 1990, pp. 1028-1031.

Niknejad et al; "Analysis and Optimation of Monolithic Inductors and Transformers for RF ICs", 1997, pp. 375-378.

Niknejad et al; "Analysis, Design, and Optimization of Spiral Inductors and Transformers for Si RF IC's", Oct. 1998, pp. 1470-1481.

Niknejad et al; Numerically Stable Green Function for Modeling and Analysis of Substrate Coupling in Integrated Circuits, Apr. 1998, 305-315.

Parameswaran et al; "A New Approach for the Fabrication of Micromechanical Structures", Dec. 6, 1998, pp. 289-307.

Park et al; "A Low-Noise, 900 MHz VCO in 0.6µm CMOS"; May 1999, pp. 586-591.

Parker et al; "A Low-Noise 1.6-GHz CMOS PLL with On-Chip Loop Filter"; 1997, pp. 407, 409-410.

Phillips, The HC-5502X14X Telephone Subscriber Line Interface Circuits (SLIC), Jan. 1997.

Radke et al; "A 14-Bit Current-Mode ΣΔ DAC Based Upon Rotated Data Weighted Averaging"; Aug. 2000, pp. 1074-1084.

Rao, Sailesh; Short Course: Local Area Networks, International Solid State Circuits Conference; Sailesh Rao; Outline Implementing Gigabit Ethernet Over Cat-5 Twisted-Pair Cabling; Jack Kenny; Signal Processing and Detection in Gigabit Ethernet; Feb. 1999; 3 pages.

Razavi; "Principles of Data Conversion System Design"; Textbook IEEE Press; Jan. 1995; 139 pages.

Razavi; "SP 23.6: A 1.8 GHz CMOS Voltage-Controlled Oscillator"; 1997, pp. 388-389.

Regan, "ADSL Line Driver/Receiver Design Guide", Part 1, Feb. 2000.

Reynolds, "A 320 MHz CMOS triple 8b DAC with on-chip PLL and hardware cursor", Feb. 1994, pp. 50-51.

Rofougaran et al; "SP 24.6: A 900 MHz CMOS LC-Oscillator with Quadrature Outputs", 1996.

Roo et al; "A CMOS Transceiver Analog Front-end for Gigabit Ethernet over Cat-5 Cables"; Solid State Circuits Conf., Feb. 5, 2001, Digest of Technical Papers; Journal of IEEE Solid State Circuits, Feb. 2001.

Rudell et al; "A 1.9-GHz Wide-Band IF Double Conversion CMOS Receiver for Cordless Telephone Applications", 1997, pp. 2071-2088.

Rudell et al; Recent Developments in High Integration Multi-Standard CMOS Transceivers for Personal Communcation Systems, 1998, 149-154.

Rudell et al; "SA 18.3: A 1.9 GHz Wide-Band IF Double Conversion CMOS Integrated Receiver for Cordless Telephone Applications", 1997, pp. 304-305, 476.

Sato et al; "SP 21.2: A 1.9 GHz Single-Chip IF Transceiver for Digital Cordless Phones", Feb. 10, 1996.

Sedra et al, "Microelectronic Circuits", 3rd Edition, Mar. 1991.

Sedra et al; "Micro-Electronic Circuits", Feb. 1982, pp. 95-97 and 243-247.

Sedra et al; "Microelectronic Circuits", Third Edition, Mar. 1991, pp. 48-115.

Sedra et al; "Microelectronic Circuits", Third Edition, Mar. 1991, pp. 86-92.

Sedra et al; "Microelectronic Circuits," Third Edition, Chapter 2: Operational Amplifiers, Section 2.4; pp. 61-63, Mar. 1991.

Shoael et al; "A 3V Low Power 0.25µm CMOS 100Mb/s Receiver for Fast Ethernet"; May 6, 2001.

Shoval et al; A 100 Mb/s BiCMOS Adaptive Pulse-Shaping Filter, Dec. 1995, 1692-1702.

Shoval et al; "A CMOS Mixed-Signal 100Mb/s Receive Architecture for Fast Ethernet", 1999.

Shoval et al; "WA 18.7—A Combined 10/125 Mbaud Twisted-Pair Line Driver with Programmable Performance/Power Features"; IEEE Int'l. Solid State Circuit Conf. Feb. 2000; Solid State Circuits, IEEE Journal of, vol. 35, Issue 12, Nov. 2000; pp. 314-315.

Shui et al; "Mismatch Shaping for a Current-Mode Multibit Delta-Sigma DAC", Mar. 1999; pp. 331-338.

Song et al; "FP 12.1: NRZ Timing Recovery Technique for Band-Limited Channels" (Slide Supplement), 1996.

Song, Bang-Sup et al; "FP 12.1: NRZ Timing Recovery Technique for Band-Limited Channels", ISSCC 96/Session 12/Serial Data Communications/Paper FP 12.1, 1996 IEEE International Solid State Conference, pp. 194-196.

Song; "Dual Mode Transmitter with Adaptively Controlled Slew Rate and Impedance Supporting Wide Range Data Rates"; ASIC/SOC Conf., Sep. 9-12, 2001.

Sonntag et al; "FAM: 11.5: A Monolithic CMOS 10MHz DPLL for Burse-Mode"; IEEE Solid State Circuits Conf.; Feb. 1990.

Soyuer et al; "A Monolithic 2.3-Gb/s 100-mW Clock and Data Recovery Circuit in Silicon Bipolar Technology", Dec. 1993, pp. 1310-1313.

Stephens, "Active Output Impedance for ADLS Line Drivers", Nov. 2002.

Stonick et al; An Adaptive PAM-4 5-Gb/s Backplane Transceiver in 0.25-um CMOS; IEEE Journal of Solid-State Circuits, vol. 38, No. 3, Mar. 2003; pp. 436-443.

Su et al; "A CMOS OVersampling D/A Converter with a Current-Mode Semidigital Reconstruction Filter", Dec. 1993, pp. 1224-1233.

Su et al; "Experimental Results and Modeling Techniques for Substrate Noise in Mixed-Signal Integrated Circuits", Apr. 1993, pp. 420-430.

Takakura et al; "A 10 bit 80 MHz glitchless CMOS D/A converter", May 1991, pp. 26.5.1-26.5.4.

Techdictionary.com definition of decoder, Link: http://www.techdictionary.com; Dec. 2005; 1 page.

Tham, Joo Leong et al; "A 2.7-V 900 MHz/1.9-GHz Dual-Band Transceiver IC for Digital Wireless Communication", 1999, pp. 286-291.

The Authoritative Dictionary of IEEE Standards Terms, 7th Edition; Jul. 2000; p. 280.

The Electrical Engineering Handbook, Chapter 31, "D/A and A/D Converters", Richard C. Dorf, editor, CRC Press, 1993.

Tsutomu Kamoto; "An 8-bit 2-ns Monolithic DAC", Feb. 1988.

Uda et al; "125Mbit/s Fiber Optic Transmitter/Receiver with Duplex Connector", Fiber Optic Communications Development Div., NEC Corporation, NEC Engineering, Ltd., Fiber and Integrated Optics, vol. 5, Issue 3; Jan. 1985 (and English Language Translation).

University of Pennsylvania CSE Digital Logic Lab re decoders. Link: http://www.cse,dmu.ac.uk/~sexton/WWW/Pages/cs2.html; Dec. 2005; 3 pages.

Van de Plassche; "Integrated Analog-to-Digital and Digital-to-Analog Converters—Chapter 6"; Boston: Clower Academic Publishers; May 1994; pp. 211-271.

Van der Plas et al; "A 14-Bit Intrinsic Accuracy Q2 Random Walk CMOS DAC", Dec. 1999, pp. 1708-1718.

Waizman; "FA 18.5: A Delay Line Loop for Frequency Synthesis of De-Skewed Clock"; Feb. 18, 1994, pp. 298-299.

Walker et al; A Two Chip 1.5 GBd Serial Link Interface, Dec. 1992.

Wang et al; A 1.2 GHz programmable DLL-Based Frequency Multiplier for Wireless Applications; Dec. 2004.

Wang et al; "WP 23.8: A 9.8 GHz Back-Gate Tuned VCO in 0.35 um CMOS", 1999, pp. 406-407, 484.

Wang, HongMo; "WP 23.8: A 9.8 GHz Back-Gate Tuned VCO in 0.35µm CMOS", ISSCC99, Session 23, Paper WP 23.8 1999 IEEE International Solid-State Circuits Conference, pp. 406-407, 484.

Weaver, Jr.; "A Third Method of Generation and Detection of Single-Sideband Signals", Dec. 1956, pp. 1703-1705.

Weigandt et al; "Analysis of Timing Jitters in CMOS Ring Oscillators"; IEEE Symposium on Circuits and Systems; May 1994; pp. 27-30.

Wikner et al; "Modeling of CMOS Digital-to Analog Converters for Telecommunication"; May 1999, pp. 489-499.

Wu et al; "A low glitch 10-bit 75 MHz CMOS video D/A converter", Jan. 1995, pp. 68-72.

Yamaguchi et al; "400Mbit/s Submarine Optical Repeater Using Integrated Circuits", Fujitsu Laboratories Ltd.; Jan. 1986 (and English Language Translation).

Yee et al; "An Integratable 1-2.5 Gbps Low Jitter CMOS Transceiver with Built in Self Test Capability", 1999.

Young et al; "A Low-Noise RF Voltage-Controlled Oscillator Using On-Chip High-Q Three-Dimensional Coil Inductor and Micromachined Variable Capacitor"; Jun. 8-11, 1998, pp. 128-131.

Young et al; "A Micromachined Variable Capacitor for Monolithic Low-Noise VCOS"; 1996, pp. 86-89.

Young et al; "Monolithic High-Performance three-Dimensional Coil Inductors for Wireless Communications", 1997.

* cited by examiner

APPARATUS AND METHOD FOR CONVERTING SINGLE-ENDED SIGNALS TO A DIFFERENTIAL SIGNAL, AND TRANSCEIVER EMPLOYING SAME

INCORPORATION BY REFERENCE OF RELATED APPLICATIONS

This application is a Continuation of U.S. patent application Ser. No. 09/920,241, filed Aug. 1, 2001 now U.S. Pat. No. 7,433,655, which application is a continuation-in-part of U.S. patent application Ser. No. 09/629,092 (now U.S. Pat. No. 6,775,529), filed Jul. 31, 2000.

The present application is related to the following commonly-assigned applications: U.S. patent application Ser. No. 09/737,743, filed Dec. 18, 2000; and U.S. patent application Ser. No. 09/737,474 (now U.S. Pat. No. 6,462,688), filed Dec. 18, 2000. The disclosures of the above applications are incorporated herein by reference.

BACKGROUND

1. Field of the Invention

The present invention relates generally to communication circuitry and, more particularly, to a method and apparatus for use in a communication circuit, such as an Ethernet or other network transceiver, for converting single-ended signals to a differential signal.

2. Related Art

In communication transceivers, and particularly in Ethernet transceivers which are capable of transmitting and receiving data at 1000 megabits bits per second, communication is possible in a full-duplex mode. In other words, transmitting and receiving of data can occur simultaneously on a single communication channel. Implementation of such a full-duplex communication channel results in a composite signal ($V_{TX}$) being present across the output terminals of the transceiver, the composite signal $V_{TX}$ having a differential transmission signal component and a differential receive signal component. In such a communication channel, the received signal ($V_{RCV}$) is derived by simply subtracting the transmitted signal ($V_T$) from the composite signal $V_{TX}$ that is present at the transceiver output terminals. Hence, $V_{RCV}=V_{TX}-V_T$.

This subtraction can be accomplished by generating a signal (referred to as a replica signal) which substantially replicates the transmitted signal, and canceling or subtracting the generated replica signal from the composite signal $V_{TX}$ at the output terminals of the transceiver. However, the replica signal is generated as two single-ended voltages, such as $V_{TXR+}$ and $V_{TXR-}$, whereas the composite signal present at the output terminals of the transceiver is a differential signal. Consequently, in order to cancel the replica signal from the composite signal to thereby obtain the received signal, the two single-ended voltage signals must first be converted to a differential signal that can then be subtracted from the composite signal. This conversion, however, requires additional circuitry which adds to the cost and complexity of the transceiver.

SUMMARY

The present invention relates to a method and apparatus for converting the single-ended voltage signals in an Ethernet transceiver into a differential voltage signal, so that the differential voltage signal can be subtracted from the composite signal to produce an accurate receive signal.

According to one aspect of the present invention, a communication circuit is provided for an Ethernet transceiver. The communication circuit preferably includes a first sub-circuit having a first input which receives a composite differential signal including first and second differential signal components, a second input which receives a differential replica transmission signal, and an output which provides a differential receive signal which comprises the composite differential signal minus the differential replica transmission signal. The communication circuit also may include a second sub-circuit which produces first and second single-ended replica transmission signals which together substantially comprise a replica of the first differential signal component of the composite differential signal and a third sub-circuit, which is coupled to the first and second sub-circuits, and which produces the differential replica transmission signal from the first and second single-ended replica transmission signals.

The communication circuit may further include a fourth sub-circuit which is coupled to the first sub-circuit and which produces a time-shift between the first differential signal component of the composite differential signal and the second differential signal component of the composite differential signal. The fourth sub-circuit may comprise a delay circuit which introduces a delay in the first differential signal component relative to the second differential signal component and, more particularly, may introduce a predetermined delay in the differential replica transmission signal relative to the first and second single-ended replica transmission signals from which the differential replica transmission signal is produced. The delay introduced by the fourth sub-circuit preferably substantially matches the predetermined delay introduced by the third sub-circuit. Also preferably, the first and second single-ended replica transmission signals are Class B signals, and the differential replica transmission signal is preferably produced from the first and second single-ended Class B replica transmission signals with a single operational amplifier.

According to another aspect of the invention, a communication circuit for an Ethernet transceiver includes: summing means having a first input for receiving a composite differential signal including first and second differential signal components, a second input for receiving a differential replica transmission signal, and an output for providing a differential receive signal which comprises the composite differential signal minus the differential replica transmission signal; replicating means for producing first and second single-ended replica transmission signals which together substantially comprise a replica of the first differential signal component of the composite differential signal; and converting means coupled to the summing means and the replicating means for producing the differential replica transmission signal from the first and second single-ended replica transmission signals.

According to yet another aspect of the present invention, in an Ethernet transceiver a composite differential signal including first and second differential signal components is received at a first input, a differential replica transmission signal is received at a second input, the composite differential signal and the differential replica transmission signal are combined to thereby provide at an output a differential receive signal which comprises the composite differential signal minus the differential replica transmission signal. The differential replica transmission signal is developed from first and second single-ended replica transmission signals, which together substantially comprise a replica of the first differential transmission signal component of the composite differential signal.

DETAILED DESCRIPTION

While the present invention will be described with respect to an Ethernet controller card for use in general purpose computers, printers, routers, etc. it is to be understood that the present invention may find applicability in other fields such as Internet communications, telecommunications, or any processor-to-processor applications using full-duplex communication. Also, rather than being embodied in discrete card, the method and apparatus of the present invention alternatively may advantageously be incorporated directly into a computer "mother board" or any other suitable hardware configuration, if desired.

Figure 1:
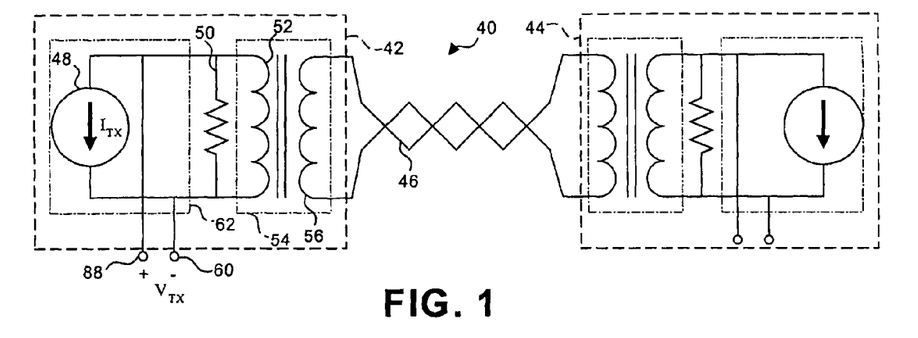
FIG. 1 is a high-level schematic diagram illustrating a communication channel in connection with which the method and apparatus of the present invention may be used.

Communication in an Ethernet computer network is illustrated in FIG. 1. As shown, an Ethernet communication channel 40 comprises a first Ethernet transceiver 42, a second Ethernet transceiver 44, and a two-wire interconnection 46 between the first Ethernet transceiver 42 and the second Ethernet transceiver 44. For example, the two-wire interconnection 46 may comprise a single twisted-pair of a Category 5 cable in accordance with IEEE gigabit transmission standard No. 802.3ab. As the Ethernet transceivers 42 and 44 may be substantially identical, only one of them is described herein.

The Ethernet transceiver 42 has a controlled current source 48, which is used to inject into the Ethernet transceiver 42 a control current $I_{TX}$, which corresponds to a signal to be transmitted from the Ethernet transceiver 42 to the Ethernet transceiver 44. Ethernet transceiver 42 also has a termination resistance 50 and a first coil 52 of a center-tap transformer 54. The center-tap transformer 54 also has a second coil 56 coupled to the two-wire interconnection 46 to provide signals transmitted by the first Ethernet transceiver 42 to the second Ethernet transceiver 44. The center-tap transformer 54 serves to couple AC voltage signals between the Ethernet transceivers 42 and 44 while effectively decoupling the Ethernet transceiver 42 from the Ethernet transceiver 44 with respect to DC voltage signals. A pair of terminals 58, 60 is provided to measure a voltage $V_{TX}$ present across the resistor 50 as a result of both signals transmitted by the Ethernet transceiver 42 and signals received by the Ethernet transceiver 42 from the Ethernet transceiver 44 via the two-wire interconnection 46. The voltage $V_{TX}$ thus comprises a composite differential signal that includes a differential transmission signal component and a differential receive signal component.

As described in more detail below, the differential receive signal component of the composite differential signal $V_{TX}$ is determined in accordance with the present invention by subtracting a replica of the differential transmission signal component from the composite differential signal $V_{TX}$. In the illustrated embodiment, the Ethernet transceiver 42 includes the termination resistance 50, the center-tap transformer 54, and an integrated circuit 62 containing communications circuitry for implementing the functionality of the Ethernet transceiver 42.

Figure 2:
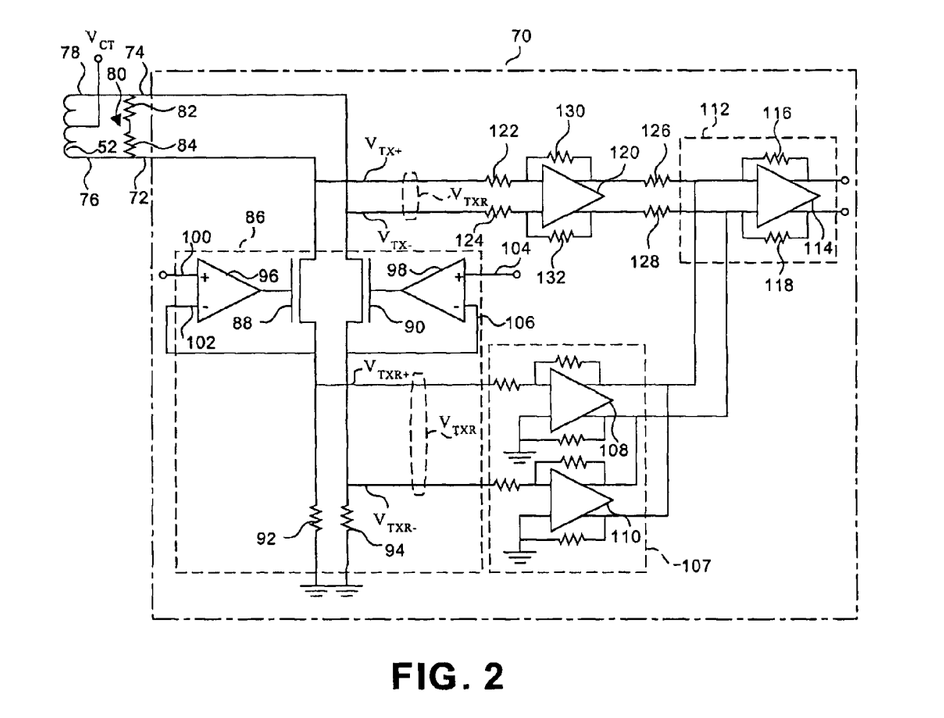
FIG. 2 is a detailed schematic diagram illustrating one embodiment of a transceiver according to the principles of the present invention.

An exemplary embodiment of such Ethernet transceiver communications circuitry is illustrated in the schematic of FIG. 2. As shown in FIG. 2, an integrated circuit 70 has a pair of output terminals 72, 74, which are coupled to terminals 76, 78, respectively, of the winding 52 of the center-tap transformer 54. Current in the winding 52 of the center-tap transformer 54 induces a proportional current in the secondary winding (not shown in FIG. 2) of the center-tap transformer 54, and that proportional current is communicated over the two-wire interconnection 46 (FIG. 1) to another Ethernet transceiver coupled thereto. Also coupled between the output terminals 72, 74 is a termination resistance 80, which, in the illustrated embodiment of FIG. 2, comprises a pair of termination resistors 82, 84. Preferably, the termination resistors 82, 84 have resistance values to substantially match the 100 ohm characteristic impedance of Category 5 cable in accordance with established standards for Ethernet connections.

The integrated circuit 70 also includes a transmission signal replicator 86 or other suitable circuitry for generating first and second single-ended replica transmission signals $V_{TXR+}$ and $V_{TXR-}$, which together substantially comprise a replica of the differential transmission component of the composite differential signal $V_{TX}$. In the illustrated embodiment, the transmission signal replicator 86 comprises a pair of metal-oxide semiconductor (MOS) transistors 88, 90.

The transistor 88 is coupled between the output terminal 72 and one end of a resistor 92, the other end of the resistor 92 being coupled to ground. Similarly, the transistor 90 is coupled between the output terminal 74 and one end of a resistor 94, the other end of which is coupled to ground. The gate of each transistor 88, 90 is coupled to and driven by the output of a respective operational amplifier 96, 98. The operational amplifier 96 has a non-inverting input 100 and an inverting input 102. The inverting input 102 of the operational amplifier 96 receives a feedback signal from the junction of the source of the transistor 88 and the resistor 92. Likewise, the operational amplifier 98 has a non-inverting input 104 and an inverting input 106, which receives a feedback signal from the junction of the source of the transistor 90 and the resistor 94.

A differential control voltage signal is applied between the non-inverting input 100 of the operational amplifier 96 and the non-inverting input 104 of the operational amplifier 98. This differential control voltage signal, when subjected to the voltage-to-current conversion brought about by the transmission signal replicator 86, provides the differential transmit signal component at the output terminals 72, 74. The feedback signal to the inverting input 102 of the operational amplifier 96 comprises a first single-ended replica transmit signal $V_{TXR+}$, and the feedback signal to the inverting input 106 of the operational amplifier 98 comprises a second replica transmit signal $V_{TXR-}$.

The single-ended replica transmit signals $V_{TXR+}$ and $V_{TXR-}$ are converted to a differential replica transmit signal by a converter circuit 107, which comprises respective differential operational amplifiers 108, 110, each provided with suitable input and feedback resistors, as shown in FIG. 2. The outputs of the differential operational amplifiers 108 and 110 are coupled to a differential active summner 112, which, in the embodiment of FIG. 2, comprises a differential operational amplifier 114 with feedback resistors 116, 118.

Because the differential operational amplifiers 108 and 110 introduce a delay into the replica transmissions signals $V_{TXR+}$ and $V_{TXR-}$, the composite differential signal $V_{TX}$ is coupled to the differential active summer 112 through a further differential operational amplifier 120 arranged in a unity-gain configuration, with input resistors 122, 124, output resistors 126, 128, and feedback resistors 130, 132. This unity-gain operational amplifier simply provides a delay in the composite differential signal $V_{TX}$ which preferably substantially matches the delay introduced in the replica transmission signals $V_{TXR+}$ and $V_{TXR-}$ by the operational amplifiers 108 and 110. As will be readily appreciated by those of ordinary skill in the art, the various input, output, and feedback resistance values associated with the operational amplifiers 108, 110, and 120 may be selected to ensure that these delays are substantially equal to one another.

Figure 3:
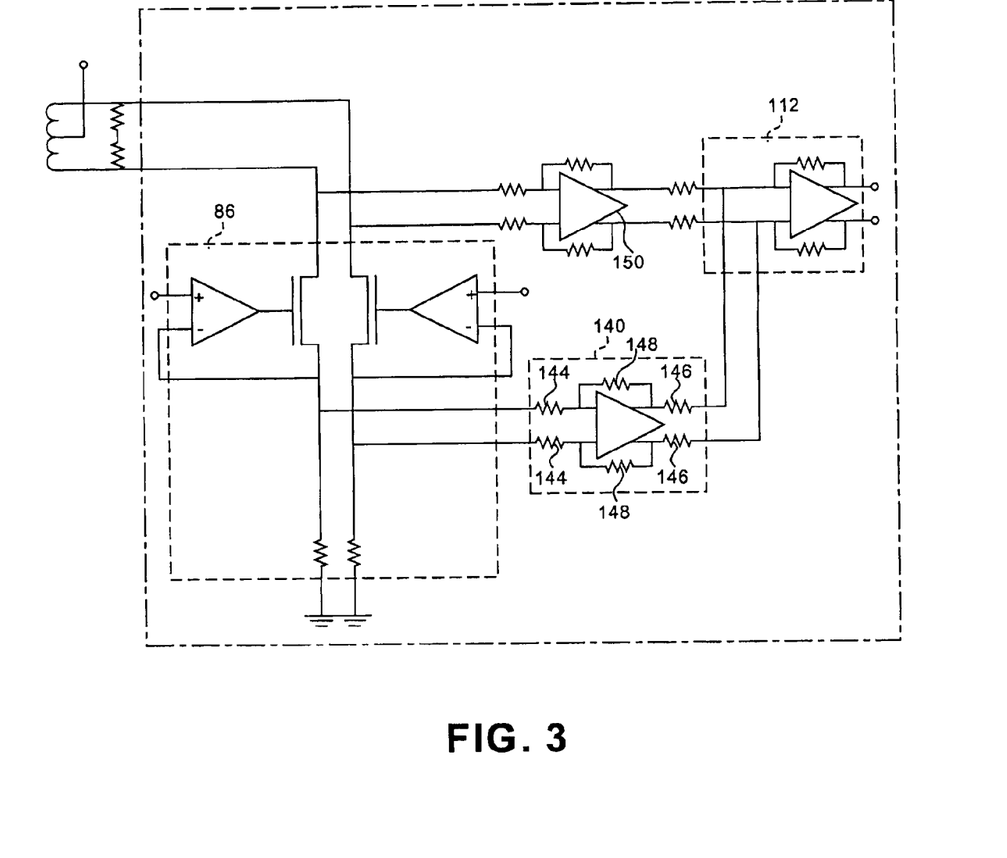
FIG. 3 is a detailed schematic diagram illustrating a second embodiment of a transceiver according to the principles of the present invention.

An alternative embodiment of a communications circuit in accordance with the present invention is shown in the schematic diagram of FIG. 3. Because the transmission signal replicator 86 and the differential active summer 112 in the embodiment of FIG. 3 are identical to those in the embodiment of FIG. 2, the details of those sub-circuits are omitted from the description of the embodiment of FIG. 3. The embodiment of FIG. 3, however, differs from the embodiment of FIG. 2 in the structure of the sub-circuit provided for converting the single-ended replica transmission signals $V_{TXR+}$ and $V_{TXR-}$ into a differential replica transmission signal $V_{TXR}$.

More particularly, as shown in FIG. 3, a converter circuit 140 is coupled to the transmission signal replicator 86 and to the differential active summer 112 to produce the differential replica transmission signal $V_{TXR}$ from the single-ended replica transmission signals $V_{TXR+}$ and $V_{TXR-}$. Just as in the embodiment of FIG. 2, the embodiment of FIG. 3 includes a unity-gain differential operational amplifier 150, which provides a delay in the differential composite signal $V_{TX}$ to substantially match the delay introduced in the differential replica transmission signal $V_{TXR}$ by the converter circuit 140. As will be appreciated by those of ordinary skill in the art, the differential operational amplifier 150 is preferably provided with input, output, and feedback resistors having resistance values which give the differential operational amplifier 150 a unity-gain value. Accordingly, the differential active summer 112 receives as input the delayed differential composite signal $V_{TX}$ and the delayed differential replica transmission signal $V_{TXR}$ and subtracts the latter signal from the former to produce at an output of the differential active summer 112 a differential receive signal which comprises the composite differential signal minus the differential replica transmission signal and thus corresponds to the signal received by the transceiver 70.

The simplification of the converter circuit 140 in the embodiment of FIG. 3, compared to the converter circuit 107 in the embodiment of FIG. 2, is made possible by the fact that the single-ended replica transmission signals $V_{TXR+}$ and $V_{TXR-}$ produced by the transmission signal replicator 86 in the illustrated embodiment are characterized by the feature that when $V_{TXR+}$ is asserted then $V_{TXR-}$ is zero (or ground), and when $V_{TXR-}$ is asserted then $V_{TXR+}$ is zero (or ground). It is because the single-ended replica transmission signals $V_{TXR+}$ and $V_{TXR-}$ have this characteristic that the two differential operational amplifiers 108 and 110 of the converter circuit 107 in the embodiment of FIG. 2 can be replaced by the single differential operational amplifier 142 in the converter circuit 140 of the embodiment of FIG. 3.

This reduction in components in the converter circuit 140 provides not only substantial simplification of the integrated circuit 70 as a whole, but it also reduces the well-recognized manufacturing problem of component mismatch, such as between die two differential operational amplifiers 108 and 110 of the embodiment of FIG. 2, for example, and improves common-mode rejection, which, in turn, results in overall improved performance of the transceiver 42.

The foregoing description is for the purpose of teaching those skilled in the art the best mode of carrying out the invention and is to be construed as illustrative only. Numerous modifications and alternative embodiments of the invention will be apparent to those skilled in the art in view of this description, and the details of the disclosed structure may be varied substantially without departing from the spirit of the invention. Accordingly, the exclusive use of all modifications within the scope of the appended claims is reserved.

What is claimed is:

1. A communication circuit comprising:
   a replica circuit that generates first and second single-ended replica transmit signals,
   wherein when one of the first and second single-ended replica transmit signals is asserted, the other of the first and second single-ended replica transmit signals is not asserted;
   a converter circuit that comprises a differential amplifier including first and second inputs that receive the first and second single-ended replica transmit signals, respectively, wherein the converter circuit converts the first and second single-ended replica transmit signals to a differential replica transmit signal; and
   a receive circuit that generates a differential receive signal based on a differential composite signal and the differential replica transmit signal.

2. The communication circuit of claim 1 wherein the other of the first and second single-ended replica transmit signals is equal to a reference potential when the other of the first and second single-ended replica transmit signals is not asserted.

3. The communication circuit of claim 2 wherein the reference potential is equal to ground.

4. The communication circuit of claim 1 further comprising a delay circuit that delays the differential composite signal that is input to the receive circuit.

5. The communication circuit of claim 4 wherein the converter circuit delays the differential replica transmit signal and wherein the delay circuit compensates for the delay of the converter circuit.

6. The communication circuit of claim 1 wherein the first and second single-ended replica transmit signals include Class B signals.

7. The communication circuit of claim 1 wherein the differential amplifier comprises an operational amplifier.

8. The communication circuit of claim 1 wherein the differential amplifier further comprises first and second outputs and wherein the converter circuit comprises:
   a first resistance that couples the first input to the first output; and
   a second resistance that couples the second input to the second output.

9. The communication circuit of claim 1 wherein the receive circuit comprises a summer that subtracts the differential replica transmit signal from the differential composite signal.

10. A communication circuit comprising:
    a transmit circuit comprising:
       first and second transistors;
       a first amplifier that comprises a first input that receives a first control voltage, an output that communicates with a control terminal of the first transistor and a second input that receives a first single-ended replica transmit signal from a first terminal of the first transistor; and
       a second amplifier that comprises a first input that receives a second control voltage, an output that communicates with a control terminal of the second transistor and a second input that receives a second single-ended replica transmit signal from a second terminal of the second transistor, wherein when one of the first and second single-ended replica transmit signals is asserted, the other of the first and second single-ended replica transmit signals is not asserted;

a converter circuit that comprises a differential amplifier including first and second inputs that receive the first and second single-ended replica transmit signals, respectively, wherein the converter circuit converts the first and second single-ended replica transmit signals to a differential replica transmit signal; and a receive circuit that generates a differential receive signal based on a differential composite signal and the differential replica transmit signal.

11. The communication circuit of claim 10 wherein the other of the first and second single-ended replica transmit signals is equal to a reference potential when the other of the first and second single-ended replica transmit signals is not asserted.

12. The communication circuit of claim 11 wherein the reference potential is equal to ground.

13. The communication circuit of claim 10 further comprising a delay circuit that delays the differential composite signal that is input to the receive circuit.

14. The communication circuit of claim 13 wherein the converter circuit delays the differential replica transmit signal and wherein the delay circuit compensates for the delay of the converter circuit.

15. The communication circuit of claim 10 wherein the first and second single-ended replica transmit signals include Class B signals.

16. The communication circuit of claim 10 wherein the amplifier comprises an operational amplifier.

17. The communication circuit of claim 10 wherein the amplifier comprises first and second outputs and wherein the converter circuit comprises:

a first resistance that couples the first input to the first output; and a second resistance that couples the second input to the second output.

18. The communication circuit of claim 10 wherein the receive circuit comprises a summer that subtracts the differential replica transmit signal from the composite differential signal.

19. A method comprising:

generating first and second single-ended replica transmit signals;

asserting one of the first and second single-ended replica transmit signals while the other of the first and second single-ended replica transmit signals is not asserted;

coupling the first and second single-ended replica transmit signals to first and second inputs of a differential amplifier;

converting the first and second single-ended replica transmit signals to a differential replica transmit signal using the differential amplifier; and generating a differential receive signal based on a differential composite signal and the differential replica transmit signal.

20. The method of claim 19 further comprising delaying the differential composite signal that is input to the receive circuit.

21. The method of claim 19 wherein the first and second single-ended replica transmit signals are Class B signals.

22. The method of claim 19 wherein the amplifier comprises an operational amplifier.

23. The method of claim 19 further comprising subtracting the differential replica transmit signal from the differential composite signal.

24. The method of claim 19 wherein when the other of the first and second single-ended replica transmit signals is not asserted, the other of the first and second single-ended replica transmit signals is equal to a reference potential.

25. The method of claim 24 wherein the reference potential is equal to ground.

* * * * *